June 8, 1943.  A. BOYNTON  2,321,003
DIFFERENTIAL STAGE LIFT FLOW DEVICE
Filed Dec. 8, 1939  3 Sheets-Sheet 1
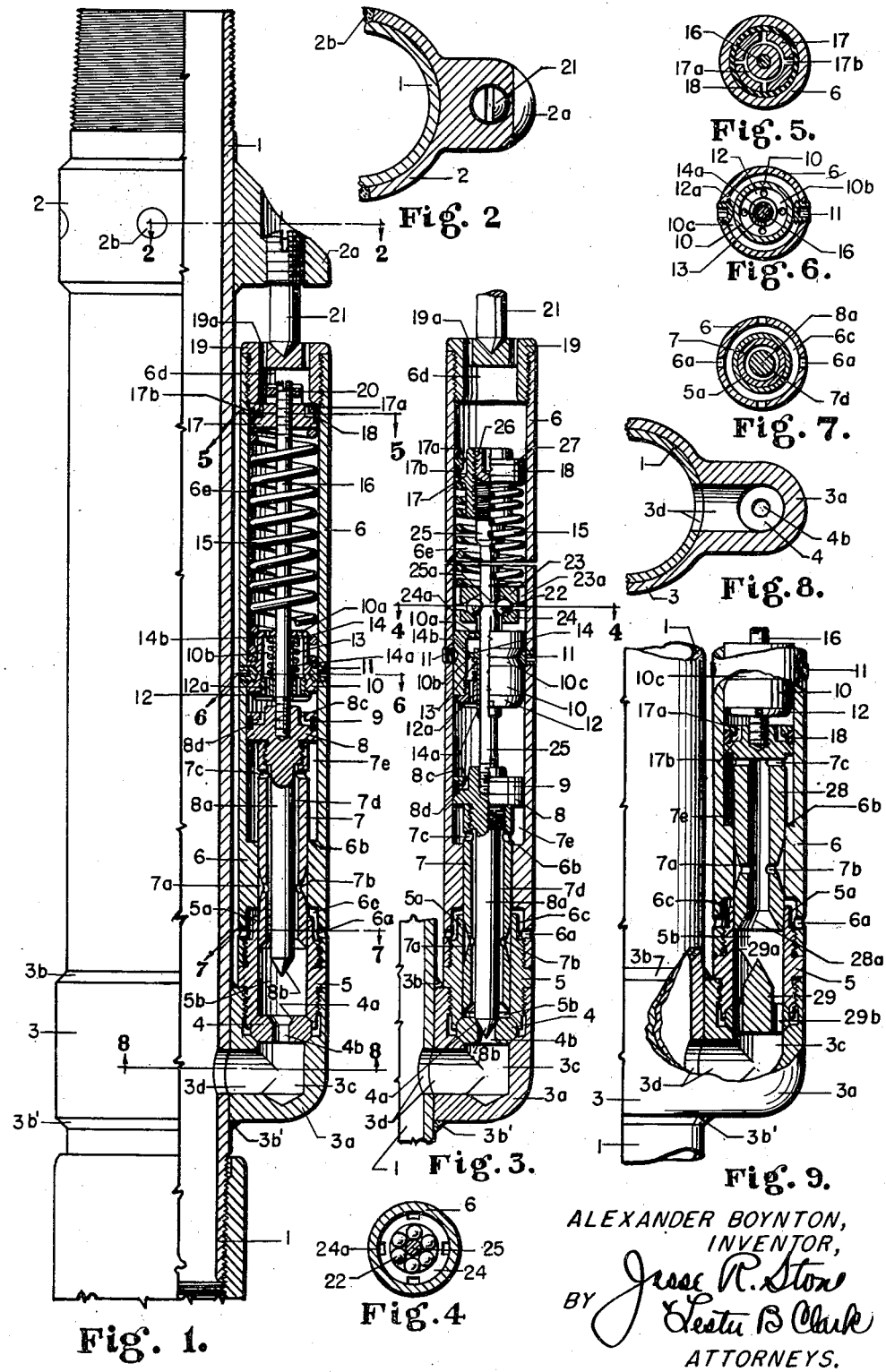
ALEXANDER BOYNTON,
INVENTOR,
BY Jesse R. Stow
Lester B Clark
ATTORNEYS.

ALEXANDER BOYNTON, INVENTOR,

BY Jesse R. Stone
Lester B. Clark
ATTORNEYS.

June 8, 1943.  A. BOYNTON  2,321,003
DIFFERENTIAL STAGE LIFT FLOW DEVICE
Filed Dec. 8, 1939  3 Sheets-Sheet 3
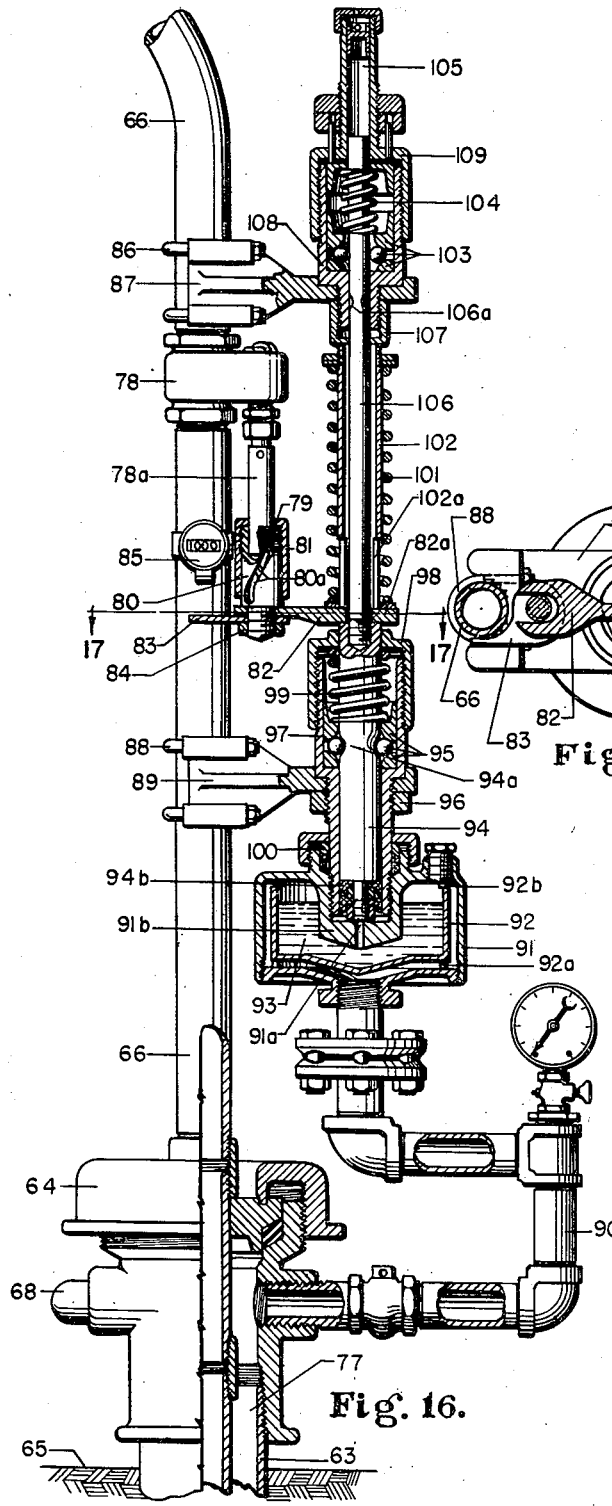
Fig. 16.
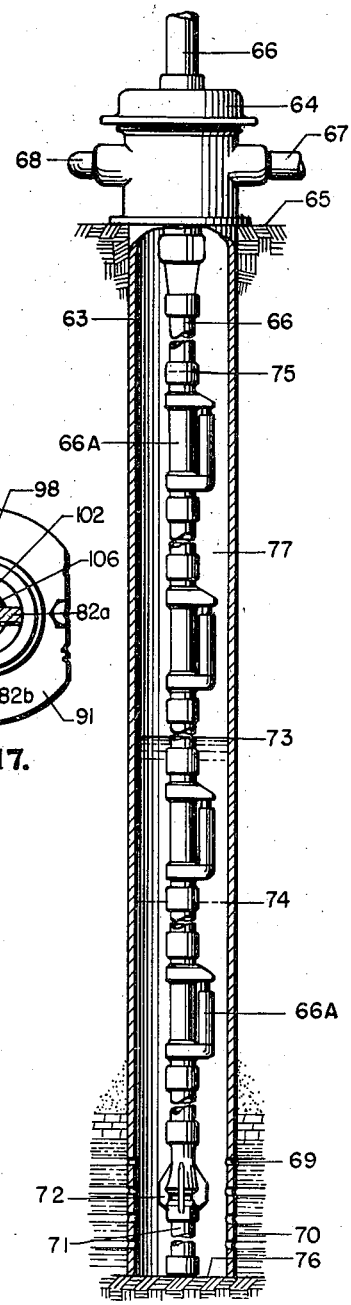
Fig. 17.
Fig. 18.
ALEXANDER BOYNTON,
INVENTOR,
BY *Jesse P. Stone*
*Lester B. Clark*
ATTORNEYS.

Patented June 8, 1943

2,321,003

UNITED STATES PATENT OFFICE 2,321,003

DIFFERENTIAL STAGE LIFT FLOW DEVICE

Alexander Boynton, San Antonio, Tex.

Application December 8, 1939, Serial No. 308,318

5 Claims. (Cl. 137—111)

My invention relates to flowing devices for oil and water wells, particularly wells producing oil or oil and water.

The principal object is to start and flow wells at low pressures with economical gas-oil ratios.

Another object is to provide mechanism for such purpose which will embody means for preventing false differentials from causing the pressure fluid valves to open at improper times, such means embodying a time element and a force element and a combination of such elements.

Another object is to provide a pressure fluid valve that will close quickly and open quickly, if and when such action is necessary.

For such purposes, I employ a differentially operated valve actuated by a piston contacting the pressure fluid and having another piston mounted on the same shaft with the first piston and the pressure fluid valve. A spring normally urging the pressure fluid valve away from its seat is employed in conjunction with a stationary latch and a check valve mounted between the movable pistons which confine a lubricant between them. A baffle is also provided to prevent abrasive substances in the pressure fluid from cutting the valve member.

The foregoing objects are attained by mechanism herein described and illustrated by the accompanying drawings, in which, Fig. 1 is mainly a longitudinal section through the preferred embodiment with the pressure fluid valve open, part of the tubing nipple being shown in outside view.

Fig. 2 is a cross section on the line 2—2, Fig. 1.

Fig. 3 is a longitudinal section through a part of the mechanism shown in Fig. 1 with the pressure fluid valve closed and a latch employed.

Fig. 4 is a cross section on the line 4—4, Fig. 3.

Fig. 5 is a cross section on the line 5—5, Fig. 1.

Fig. 6 is a cross section on the line 6—6, Fig. 1.

Fig. 7 is a cross section on the line 7—7, Fig. 1.

Fig. 8 is a cross section on the line 8—8, Fig. 1.

Fig. 9 is a partial longitudinal section and outside view illustrating a modified form of pressure fluid valve and seat.

Fig. 16 is a installation plan of a surface intermitter partly in longitudinal section and partly in outside view.

Fig. 17 is a cross section on the line 17—17, Fig. 16.

Fig. 18 is an installation plan of the flow devices in a well.

Each of the prime sections will be understood as identical with the unprimed section bearing the same reference numerals, except that some of the parts cut are different in other respects from the place shown in the sections.

Similar reference characters are employed to refer to similar parts throughout the several views of each embodiment.

Figure 10:
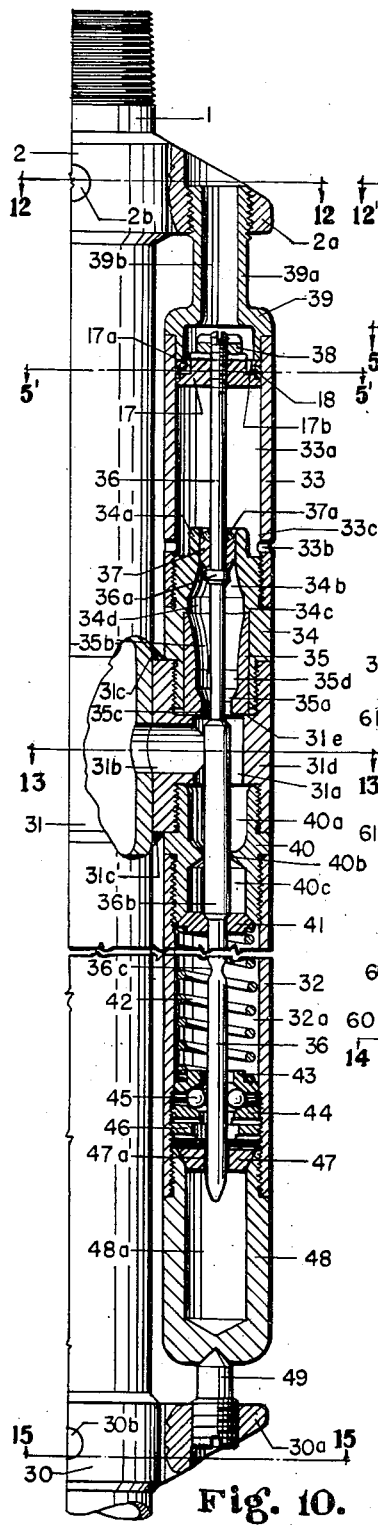
Fig 10 is mainly a longitudinal section through a modification of the invention.

The differentials will be understood to be the difference in pressures obtaining in the well within and without the well tubing.

The column of well liquid caused to stand up in the tubing above the depressed liquid level between the tubing and the casing will be referred to as the upstanding column.

Expulsion of liquid from the well will be understood as caused by expansion of pressure fluid admitted into the upstanding column by the flow devices.

The pressure fluid valve, the metering sleeve, the two pistons, the spring between them and the rod connecting them will be known as the movable assembly.

The flow devices will be understood as spaced approximately 200 to 300 feet apart in the flow tubing.

The differential force per square inch required to seat the pressure fluid valves ordinarily will be somewhat greater than the force per square inch exerted by a column of the unaerated well liquid twice as high as the distance between adjacent devices.

In Fig. 1, illustrating the preferred embodiment, the tubing nipple 1 is adapted to be threadably joined into the tubing string, as appears in Fig. 18. The upper sleeve 2, having the projection 2a, is pressed over and secured upon the nipple 1 by means of the welds 2b. The sleeve 3, having the projection 3a, likewise, is pressed over the nipple 1 and secured upon it by the peripheral welds 3b and 3b'.

The bushing 5, having threaded connection within the upper portion of the projection 3a, has its lower end firmly engaged upon the upper end of the valve seat member 4 which is thereby hermetically engaged upon an annular shoulder surrounding the upper extremity of the chamber 3c within the projection 3a. The shell 6 is threadedly joined over the upper portion of the bushing 5 and has its upper end threadedly joined over the cap 19. The stud 21, having threaded engagement within the extension 2a, has its lower conically tapered end engaged centrally within the cap 19 for the purpose of securing the shell 6 aligned with the nipple 1.

The lower piston 8 has a depending extension 8a upon the lower end of which the valve 8b is formed and adapted to engage the seat 4a to close the central opening 4b of the member 4 when the device is not intaking pressure fluid. The rod 16, slidable through the check valve member 14 and within the central opening through the upper end of the member 10, has threaded connection with the pistons 8 and 17, both pistons being closely slidable within the shell 6. The lock nut 20 may be employed to secure together the rod 16 and the piston 17.

The packing rings 9 and 18, which may be of leather or metal, may be employed to cause the slidable pistons 8 and 17 to have hermetic engagement within the shell 6. The recess 17a and the openings 17b provide that pressure fluid will force the ring 18 outward in contact with the shell 6. The recess 8c and the openings 8d, likewise, provide that a lubricant within the chamber 6e will force outward the packing ring 9 and also make hermetic the sliding engagement of the piston 8 within the shell 6.

The support nipple 10 may be pressed into the shell 6 and secured thereby the set screws 11 engaged within the triangular recess 10c (see Fig. 3). The slight coiled spring 13 supports the check valve 14 yieldably engaged against the nether side of the plate-like top of the member 10, having the openings 10a normally closed by this valve, except for the slight clearance 14b. The bushing 12, having the openings 12a, is threadedly engaged within the lower end of the nipple 10 to provide a support for the spring 13. The check valve 14 has a thin walled depending tubular extension 14a closely slidable over the rod 16 and within the bushing 12. This extension passes through the bushing 12 in order to provide a smooth surface confronting the spring 13 which surface will not become impinged upon the coils of this spring, as might happen if the extension 14a had its lower end above the bushing 12.

The metering sleeve 7, having its upper end threadedly engaged over a depending portion of the piston 8, is closely slidable within the restricted bore of the shell 6 immediately below the annular shoulder 6b. The coiled spring 15, having slight clearance within the shell 6 and having its lower end engaged upon the nipple 10, resiliently urges the piston 17 against the cap 19 and positions the metering sleeve 7 and the valve 8b as shown in Fig. 1.

The lower end of the metering recess 7a normally is positioned slightly above the horizontal opening of the chamber 6c when the piston 17 is engaged with the cap 19. When the valve 8b is closed upon its seat 4a, the upper end of the recess 7a is somewhat below the horizontal opening of the chamber 6c. In this manner, communication is cut off between the openings 6a and 7b when the movable assembly is in the upper position as in Fig. 1, and is also cut off when the movable assembly is in the lower position as in Fig. 3.

The annular metering recess 7a, being tapered to a feather edge at its upper and lower extremities, it is apparent that the greatest volume of pressure fluid will pass from the openings 6a into the openings 7b when the valve 8b is approximately half way of its travel, i. e., during one-half of the differential required to seat the valve 8b.

It will be observed that the upper and lower tapers upon the member 7 which form the recess 7a are convex in order that this recess will meter the flow of pressure fluid in proportion to the load to be lifted by it.

The baffle 5a deflects the flow of pressure fluid entering through the openings 6a and directs it through the annular chamber 6c in order to prevent the metering sleeve 7 from being abraded by foreign substances often present in the pressure fluid.

The chamber 6e between the pistons 8 and 17 may be filled with a lubricant which will ride between the pistons during the movements of the movable assembly. In this manner, lubrication is provided for the pistons and all moving parts between them. This lubricant also lubricates the check valve 14.

The pressure fluid force entering the chamber 6d through the openings 19a actuates the piston 17 and compresses the spring 15 whenever the upstanding column of well liquid within the tubing exerts a pre-determined less force than that of the pressure fluid exterior of the tubing. The compression force under which the spring 15 is installed determines the differential at which the piston 17 will begin moving downward and the total force required to compress this spring far enough to seat the valve 8b determines the operating differential of the flow devices.

It will be observed that each of the discharge openings below the valve seat 4a is many times larger than the intake openings 6a and 7b. This relation is necessary in order to maintain less pressure than that of the pressure fluid within the chamber 5b until the valve 8b is seated.

The openings 7c serve no other purpose than to afford circulation into and out of the annular space 7e between the annular shoulder 6b and the piston 8 as this piston moves.

The spring 15 and the pressure fluid within the annular space between the well casing and the flow tubing exert constant forces, while the upstanding column exerts the variable force which produces the differential. The spring 15 and the upstanding liquid column exert the valve unseating forces, while the pressure fluid exerts the valve seating force.

The path of the pressure fluid out of the annular space between the casing and the tubing and into the upstanding liquid column in the tubing is via the lateral openings 6a, the annular chamber 6c, the metering recess 7a, the openings 7b, the annular space 7d, the chamber 5b, the central opening 4b, the chamber 3c, and the opening 3d. This path, preferably, is closed, as before stated, when the movable assembly is in its extreme upper position, as in Fig. 1, and also in its extreme lower position, as in Fig. 3. The metering recess 7a, however, may be lengthened at either or both ends to vary the metered flow of pressure fluid as may be desired.

All differentially operated flow devices will have their valve action disturbed by momentary false differentials resulting from slippage within the tubing. The impact of heavy falling slugs of well liquid will often force open all valves in the devices below the places of such impacts. The inrush of pressure fluid then will frequently expel the well liquid from the tubing as a slug. The resistance of such slugs impelled by excessive quantities of pressure fluid will kick open all higher valves as they pass them. This results in a waste of energy and greatly impairs the usefulness of differential flow devices, particularly so in deep wells.

The check valve 14 prevents the valve 8b from being suddenly forced open by false differentials. This check valve, however, does not retard the seating action of the valve 8b. During the downward movement of the movable assembly, the piston 17 forces some of the lubricant within the chamber 6e through the openings 10a, unseating the check valve 14. This displaced lubricant continues downward through the annular chamber 10b and passes through the openings 12a into the chamber above the piston 8. But after the valve 8b seats, the lubricant entrapped under the nipple 10 and the bushing 12 and above the piston 8 cannot escape back into the chamber 6e, except through the slight clearance 14b which prevents the check valve 14 from completely closing the openings 10a. This clearance should be slight enough to so impede the passage of the entrapped lubricant that the valve 8b will not recede far enough from its seat 4a to move the metering recess 7a upward so far that it will intake pressure fluid before the false differentials, tending to unseat the valve 8b, have subsided. In this manner, an even flow of pressure fluid is provided during the prevalence of true differentials and the devices are prevented from intaking pressure fluid at all other times.

In Fig. 3, which illustrates the closed position of the valve 8b, the check valve 14 is shown still open, due to the fact that the valve 8b has just closed and the check valve has not had the instant of time necessary to assume its normal closed position as in Fig. 1. A latch, however, has been added, consisting of the latch balls 22, the ball roof 23, and the ball floor 24. The latter member may be free within the shell 6 or it may be pressed in upon the member 10. The peripheral slots 23a of the ball roof 23, and 24a of the ball floor 24, provide for free circulation of the lubricant within the chamber 6e between the pistons. The ball roof 23 must have some clearance within the shell 6 in order that the latch will be free.

The latch shaft 25, slidable through the members 10, 23, 14 and 24, has a portion of restricted diameter 25a within which the latch balls 22 are adapted to engage when the valve 8b is seated, as appears in Fig. 3. The latch balls are urged inwardly by the confronting inclined surfaces of the ball roof 23 and the ball floor 24, which surfaces engage the balls in both the engaged and the disengaged positions of the latch.

The shaft 25 has its upper extremity threadedly engaged within the piston 27, corresponding to the piston 17 in Fig. 1, where it may be locked by the set plug 26 in proper position to cause the latch to be properly engaged when the valve 8b is seated.

In Fig. 9, illustrating a modified form of pressure fluid valve and seat, the piston and valve member 28 has its lower end formed into the valve 28a adapted to engage upon the valve seat 29a of the valve seat member 29. The openings 29b serve the same purpose as the openings 4b in Fig. 1.

In Fig. 10, illustrating another modified form of the invention, the tubing nipple 1 has the upper sleeve 2 pressed over it and secured upon it by the welds 2b. The lower sleeve 30 is also pressed over the nipple 1 and secured to it by the welds 30b. Likewise, the intermediate sleeve 31 may be pressed over the nipple 1 and secured to it by the peripheral welds 31c and 31c'.

The nipple 34 is threadedly joined into the upper end of the projection 31d of the sleeve 31. The internal annular shoulder 34c engages upon the upper end of the valve seat bushing 35 holding it firmly and hermetically engaged upon the annular shoulder 31e of the member 31.

The upper shell 33, having threaded connection with the nipple 34, has its upper end engaged with the support cap 39, having the tubular extension 39a threadedly engaged within the projection 2a of the sleeve 2 for the purpose of securely aligning the shell 33 with the tubing nipple 1.

The nipple 40 has threaded engagement within the lower end of the projection 31d of the member 31 and with the lower shell 32 having its lower end hermetically closed by the cap 48. This cap has a countersink in its lower end within which the tapered upper end of the securing stud 49 is engaged by means of its threaded connection through the projection 30a of the member 30. This stud serves to secure the alignment of the shell 32 and cap 48 with the tubing nipple 1.

The valve rod 36 threadedly engages centrally through the piston 17 to which it may be further secured by the lock nut 38. The valve 37 may be pressed over the rod 36, landed upon the enlargement 36a, and secured there by the weld 37a. The untapered portion of the valve 37 may be of the same length as the untapered openings 34d and 35d. Within the latter opening, this valve has a closely slidable valve fit. The upper end of the metering chamber 34b is also untapered, like the straight portion 35d of the chamber 35, and also closely receives the valve 37 with a slide valve fit.

The valve rod 36 has a lower enlargement 36b formed into a valve which seats upon the upper surface of the valve ring 41 which ring has its outer surface formed into a valve engageable with the valve seat formed upon the lower end of the nipple 40.

The ball floor 44 has threaded engagement within the shell 32 and may be locked in proper position by the lock ring 46. The latch balls 45 are adapted to be urged inwardly by the confronting inclined surfaces of the members 43 and 44 engaging the balls. The coiled spring 42, having slight clearance within the chamber 32a, has its upper end engaged under the valve ring 41 and its lower end engaged upon the ball roof 43 having some clearance within the shell 32. This spring, preferably installed under some compression, is further compressed when the valve 37 engages its seat 35a and provides the latching force when the balls 45 engage within the latching recess 36c.

The check valve 47 has a central opening through which the lower portion of the rod 36 is received with the slight clearance 47a. The upper inner surface of the cap 48 is formed into a seat for the valve 47.

The valve rod 36 is normally positioned by the engagement of the enlargement 36b upon the valve ring 41, there being then some slight clearance between the lower end of the cap 39 and the piston 17.

Pressure fluid force entering through the opening 39b contacts the piston 17 closely slidable within the chamber 33a and forces it downwardly with the valves 37 and 41, thereby compressing the spring 42 and engaging the latch balls within the recess 36c when the valve 37 closes upon its seat 35a. The piston 17 has clearance with the tubular baffle 34a when the valve 37 is seated at 35a.

The path of the pressure fluid entering the tubing is via the openings 33b, the annular baffle chamber 33c, the metering chambers 34b and 35b, and the openings 35c, 31a, and 31b. In this connection, it will be observed that there will be no flow of pressure fluid through the device at the beginning of the valve travel and no flow at the end of the valve travel, because, as previously stated, the valve 37 is closely received within the upper end of the metering chamber 34b and within the lower portion 35d of the metering chamber 35b.

The tubular baffle 34a is designed to withstand the abrasive action of the pressure fluid entering the device, and thereby protect from abrasion the rod 36 and the valve 37.

It is apparent that the openings 33b should be much smaller than the valve 37 in order that proper differences in pressures will obtain above and below the piston 17 when the device is in operation.

The chamber 32a may be filled with a lubricant which cannot escape, due to the normally seated ring valve 41 and the closely slidable fit between the ring valve 41 and the rod 36 which will retain the lubricant in all positions of the device before it is placed in service.

The valve 37 may seat freely in response to the greater pressure above the piston 17 than that below it and in further response to the greater pressure above that valve than that below it, because the valve ring 41 has large clearance with the shell 32. While the valve 37 is moving toward its seat 35a, the lower end of the rod 36 is entering and displacing part of the lubricant within the chamber 48a. During this displacement, the check valve 47 will be raised by the lubricant under it and this displaced lubricant will pass upwardly through the large clearance around the member 47 in its raised position and through the small clearance 47a, continuing upward through the large clearance which the rod 36 has with the lock ring 46, the ball floor 44 and the ball roof 43.

The upward receding movement of the valve 37 from its seat 35a is impeded by the latch and by the check valve 47. This valve, which rises while the upper valve 37 is seating, then closes immediately by gravity and resists the upward movement of the rod 36, because the lubricant seeking to compensate for the withdrawal of the rod out of the chamber 48a must move into this chamber through the small clearance 47a.

In summarizing the unseating action of the pressure fluid valve, it will be noted that the latch, in exerting a pre-determined force in holding the valve 37 seated, supplements the differential in causing a leakproof engagement of that valve upon its seat. The check valve 47 exerts no seating force upon the valve 37 but supplements the force of the latch with the time element developed by resisted migration of the lubricant. The straight portion 35d of the metering chamber 35b brings in another time element in opening the valve 37, because that valve cannot admit pressure fluid through the device until the latch springs and enough lubricant passes downward through the slight clearance 47a to allow the valve 37 to pass out of the straight portion 35d of the chamber 35b.

Part of the lubricant within the chamber 32a must pass around the ring valve 41 and into the chamber 40a during the downward movement of the rod 36. The restriction 40b, through which the enlargement 36b of the rod 36 has slight clearance, and the chamber 40a are interposed between the displaced lubricant and the path of the pressure fluid through the openings 31a and 31b in order to prevent the displaced lubricant from being blown out into the tubing.

For convenience in adjusting the device, it will be observed that after first removing the piston 17, the rod 36 may be withdrawn through the opening 39b. The piston may be made accessible for removal by screwing the tubular extension 39a upward in the projection 2a. The latch may be also adjusted by screwing the ball floor upward or downward, as is apparent.

Figure 11:
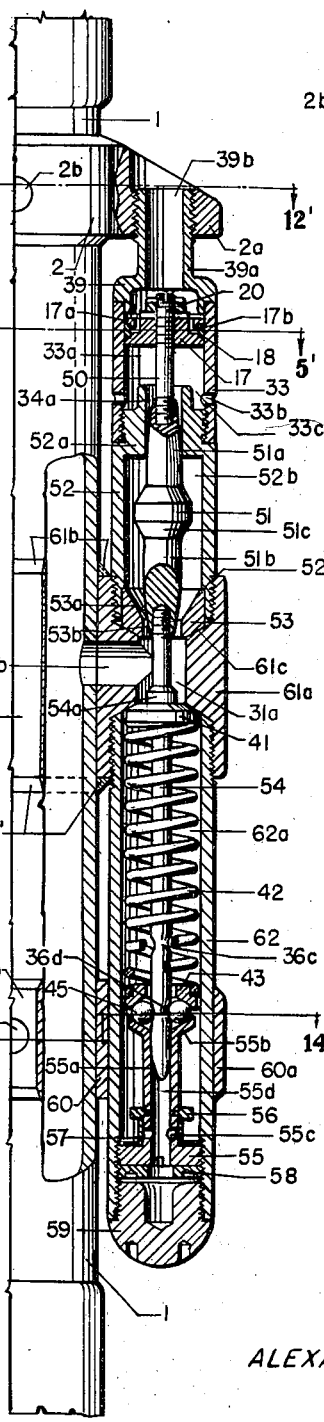
Fig. 11 is mainly a longitudinal section through another modified form of the invention.
Figure 12:
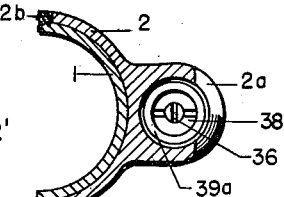
Fig. 12 is a cross section on the line 12—12, Fig. 10.
Figure 13:
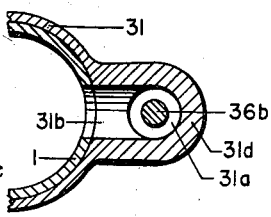
Fig. 13 is a cross section on the line 13—13, Fig. 10.
Figure 14:
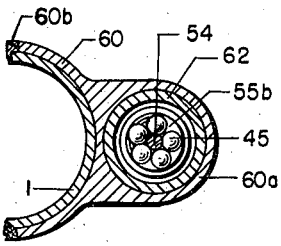
Fig. 14 is a cross section on the line 14—14, Fig. 11.
Figure 15:
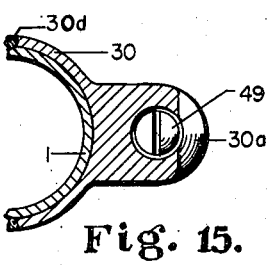
Fig. 15 is a cross section on the line 15—15, Fig. 10.

In Fig. 11, illustrating another modified form of the invention, many parts are the same in form and purpose as in preceding embodiments, and for that reason some such parts will not be discussed further.

The sleeve 61 may be pressed over the tubing nipple 1 and secured upon it by the peripheral welds 61b and 61b'. The nipple 52, having threaded engagement within the projection 61a of the member 61, has its internal annular shoulder 52c firmly engaged upon the valve seat member 53, which is thereby forced into hermetic engagement upon the internal annular shoulder 61c. The upper shell 33, having threaded engagement with the nipple 52, has its upper end engaged by the support cap 39.

The lower shell 62, having threaded engagement within the projection 61a, is closely slidable through the tubular projection 60a of the lower sleeve 60 secured upon the nipple 1 by the welds 60b. The lower end of the shell 62 is closed hermetically by the plug 59.

The piston 17, threadedly connected to the rod 50 and further secured upon it by the lock nut 20, is closely slidable within the chamber 33a of the shell 33, the packing 18, expanded by the pressure fluid entering through the openings 17a and 17b serving to prevent leakage past this piston.

The plunger 51, having its upper metering pin 51a threadedly engaged with the rod 50 and having its lower metering pin 51b threadedly engaged with the rod 54, preferably is positioned within the chamber 52b so that there is approximately the same clearance space between the pin 51a and the portion of reduced internal diameter 52a as the pin 51b has within the opening 53b when the valve 51c is halfway of its travel toward the seat 53a. The greatest diameter of the pin 51b is slightly less than the diameter of the opening 53b. The plunger 51 has the valve 51c formed upon the nether side of its central enlargement. This valve is adapted to close upon the seat 53a.

It will be observed that the metering pins 51a and 51b are convexly tapered in opposite directions. In this manner, the pin 51a will allow increasing passage of pressure fluid; while the other pin 51b will throttle the flow thereof as the valve 51c approaches its seat 53a.

During the flowing operation, the pressure fluid enters the device through the openings 33b and thence passes into the tubing 1 via the baffle chamber 33c, the chamber 52b, the opening 53b, the chamber 31a, and the opening 31b.

The chamber 62a may be filled with a lubricant. The ring valve 41 is engaged with the enlargement 54a and with a seat surrounding the opening 31a. This valve has large clearance with the shell 62 in order that part of the lubricant within the shell 62 can pass around the member 41 when the valve 51c travels toward its seat 53a.

The ball floor member 55, having the tubular extension 55a formed at its upper end into the ball floor 55b, has threaded engagement within the shell 62. The latch may be adjusted by screwing the member 55 upwardly or downwardly, any position thereof being securable by the lock ring 58. The latch balls 45 are engaged by the confronting sloping surfaces of the ball roof 43 and the ball floor 55b. These inclined surfaces and the force of the spring 42 urge the latch balls inwardly so that they will engage within the latching recess 36c when the valve 51c engages upon its seat 53a.

On the downward stroke of the rod 54, the lubricant within the chamber 55d will be forced out through the openings 55c thereby expanding the slight annular leaf spring check valve 57 far enough to permit such escape of the lubricant. The lower end of the rod 54 has slight clearance within the chamber 55d in order that it will exert an alternate piston driving and suction force upon the lubricant under it. The pins 56, secured within the tubular extension 55a, prevent the leaf spring 57 from becoming vertically displaced. This spring has slight clearance between the threaded base of the member 55 and the pins 56. The lubricant may circulate freely through the latch because of the ample clearance between the ball floor 55b and the shell 62, the considerable space between the balls 45 and the large clearance between the ball roof 43 and the rod 36.

It is apparent that during the downward movement of the valve 51c the rod 54 will move freely, because the thin leaf spring 57 will yield easily to the lubricant escaping through the openings 55c, but after the valve 51c seats, its opening will be resisted by the force of the engaged latch. After the latch releases, the upward movement of this valve will be retarded by the suction of the rod 54 within the closely conforming chamber 55d. The rod 54 then tends to pull a vacuum within the chamber 55d, because the leaf spring 57 closes the openings 55c on the upstroke of the plunger 51.

It will be observed that the pressure fluid entering the device through the openings 33b is prevented by the baffle 34a from abrading the rod 50 and the metering pin 51a.

If it be desired to cause the valve 51c to close suddenly, the latch balls may be engaged normally upon another latching surface similar to the recess 36c, as appears in Fig. 11.

If it is not desired to meter the pressure fluid, it is apparent that the metering sleeve 7 may be omitted in Figs. 1 and 3. For the same purpose, the piston 28 in Fig. 9 may be of reduced outside diameter. Likewise, metering may be avoided in Fig. 10 by expanding the chambers 34b and 35b to the diameter of the straight portion 34d. The same result may be obtained in Fig. 11 by reducing the diameters of the metering pins 51a and 51b.

Either of the flow devices herewith shown may be installed in a well, as appears in Fig. 18, wherein the well casing 63 has the tubing 66 centrally disposed within it. The casing head 64, having one opening connected with a pressure fluid line 67 and the other opening closed by a bull plug 68, provides a hermetic seal between the casing 63 and the tubing 66 proximately above the ground surface 65. The anchor string 71 may extend from the intake nipple 72 to the bottom of the well 76.

Production from the formation 70 enters the casing through the gun perforations 69 and rises to the normal level 73.

Now, to flow the well, pressure fluid will be turned into the annular space 77 via the pipe line 67. The upper end of the tubing 66 being open, there will be no resistance in the tubing. Pressure will rise rapidly in the annular space 77. Increasing differential will quickly close the differential valves in the flow devices 66A. The normal liquid level 73 will change to the depressed liquid level 74 in the annular space 77 and to the upstanding liquid level 75 in the tubing. The flow devices 66A proximately above the depressed liquid level 74 will be open and intaking pressure fluid, each device being uncovered in the open position as the depressed liquid level 74 is lowered by flowing, while, at the same time, the device next above the open one will be closing or closed according to the differential obtaining there.

In Fig. 16, I show a surface intermitter adapted to be employed in conjunction with flow devices and which can be adjusted to open the tubing valve 78 at any desired pressure within the annular space 77 and to close the tubing valve at any appreciably lesser pressure. The valve 78, threadedly joined into the tubing 66 proximately above the casing head 64, has a depending arm 78a adapted to be rotated for the purpose of opening and closing the valve. This arm has a straight pin 79 secured transversely through it and slidable within the spiral slots 80a of the shell 80, there being two of these slots receiving opposite ends of the pin 79; the cap 81, threadedly engaged over the shell 80, being employed to house the ends of the pin and the slots 80a.

The tubular bracket 90 supports the lubricator shell 91, having within it the lubricator cup 92 containing the lubricant 93. The cylinder 97 is threadedly joined into an internal boss 91b and made leakproof in its connection therewith by the stuffing box 100.

The latch 95 normally engages the groove 94a by force of the coiled spring 99 housed within the cylinder 97 closed by the cap 98. The latch shaft 106 has threaded connection with the piston 94 and is adapted to have its groove 106a engaged by the latch 103, housed within the cylinder 108, this latch being operated by the coiled spring 104.

The bracket 87 positioned upon the tubing 66 by the U bolts 86 and the bracket 89 positioned upon the tubing by the U bolts 88 secure the intermitter assembly upon and in alignment with the tubing. The nut 96 secures the cylinder 97 within the bracket 89. The cap 107 secures the lower end of the cylinder 108 within the bracket 87 and the cap 109 closes the upper end.

The spiral shell carrier 82 has the shell 80 secured between its forked end by the nut 84. The sleeve 102, slidably engaged about the shaft 106, has the opposite slots 102a which slidably engage the arms 82a and 82b of the member 82.

When a predetermined pressure fluid force builds up within the annular space 77, this force will communicate through the tubular bracket 90 to the lower end of the piston 94 via the openings 92a, 92b, and 91a, and spring the latch 95; whereupon the shell carrier 82 will be forced upward, causing the pin 79 to rotate the valve arm 78a by means of the spiral slots 80a. This movement compresses the spring 101 and causes the latch 103 to engage the groove 106a. In this operation, the lubricant 93 follows the piston and lubricates the cylinder 97 and the cups 94b secured upon the lower end of the piston 94.

The dashpot 105 cushions the upstroke of the piston 94 so as to prevent a hammering action upon the valve.

When, in the process of flowing the well, the pressure fluid force within the annular space 77 decreases to a predetermined value, the expansive force of the compressed spring 101 will spring the latch 103 and return all parts to the position shown in Fig. 16.

The finger 83, secured between the shell carrier 82 and the nut 84, is adapted to operate a mechanical counter 85 each time the valve 78 is opened.

Preferably the device in each of its embodiments should be installed as shown on the drawings with respect to the up and down position thereof. Accordingly upward and downward directions will be understood as corresponding to those shown in the drawings.

It is apparent that many minor mechanical changes and substitution of other parts for those shown can be made within the scope of the stated objects and appended claims.

What is claimed is:

1. A well flowing device comprising a tubular body having a passageway in the wall thereof with an inlet and an outlet, a valve assembly movable in and adjacent said passageway and including a valve rod extending longitudinally of the passageway, a valve on said rod, a valve seat in the passageway adapted to be engaged by the valve, means normally urging the assembly axially of the passageway to maintain the valve and valve seat in spaced relation, a piston on said rod subjected to pressure fluid about the body and tending to move the valve to closed position, a second piston on the rod, and a pressure passage to said second piston from a reduced pressure chamber between the inlet and the valve seat.

2. A well flowing device comprising a tubular body having a chamber in the wall thereof with an inlet and an outlet providing a passage through the chamber from the exterior to the interior of the body, a valve assembly in said chamber, said assembly including a rod having a valve thereon, a valve seat in said passage adapted to be engaged by said valve, spaced pistons on said rod, a metering sleeve attached to one of said pistons, said sleeve being slidable within said chamber and having a metering recess with lateral openings to meter pressure fluid from the inlet to the interior of the chamber, and spring means normally urging the valve assembly axially of the chamber to move the valve away from said seat.

3. A well flowing device comprising a tubular body having a chamber with an inlet and an outlet providing a passage through the chamber from the exterior to the interior of the body, a valve assembly in said chamber including a rod having a pressure fluid control valve thereon, a valve seat in said passage adapted to be engaged by said valve, spaced pistons on said rod subjected respectively to the pressure interiorly and exteriorly of the body, a support nipple in said chamber intermediate said pistons, a leaky check valve in said nipple, a body of lubricant in the chamber between said pistons, said check valve being adapted to delay the opening of the pressure fluid control valve, and a spring in said chamber urging the pressure fluid control valve toward its seat.

4. A nipple adapted to be connected into the tubing of a well, a shell attached to said nipple, said shell having a chamber with an inlet and an outlet providing a passage through said chamber from the exterior of said shell to the interior of said nipple, a piston assembly in said shell, said assembly including spaced pistons, subjected respectively to pressure interiorly and exteriorly of said shell, a lubricant in the shell between said pistons, a rod connecting said pistons and extending from one of said pistons and having its end formed into a valve, a metering sleeve attached to one of said pistons, said sleeve being slidable within said shell and having a metering recess with lateral openings therethrough adapted to admit pressure fluid from the inlet openings in said shell, a seat in said chamber from which said valve normally is spaced and adapted to be engaged thereby, a support nipple secured in said shell between the pistons, a check valve in said nipple, said valve being spaced slightly from its seat, a spring urging said valve toward said seat, a one-way passage for said lubricant through said nipple, said passage being controlled by said check valve which thus is adapted to delay the opening of said pressure fluid control valve, and openings communicating between the pistons most remote from said valve and the exterior of said shell.

5. In a well flowing device the combination of a body having a chamber therein, a passage from said chamber to the interior of the body, a valve assembly in said chamber, said assembly including piston means subjected to the pressure interiorly and exteriorly of the body, an inlet to said chamber from the exterior of the body so that pressure fluid exerting a pressure upon the piston means may be admitted through said chamber and passage to the interior of the body, a metering sleeve attached to said piston means and slidable therewith proximate said inlet, said metering sleeve being adapted to supply pressure from the interior of the body to one side of the piston means, and having a metering recess adapted to move into mating relation with said inlet, and means for controlling the position of the valve assembly in accordance with the differential pressure between the exterior and interior.

ALEXANDER BOYNTON.